United States Patent Office 3,022,182
Patented Feb. 20, 1962

3,022,182
INFRARED TRANSMITTING GLASSES
Given W. Cleek, Arlington, Va., and Edgar H. Hamilton, Silver Spring, Md., assignors to the United States of America as represented by the Secretary of the Navy
Filed July 17, 1956, Ser. No. 598,482
2 Claims. (Cl. 106—52)
(Granted under Title 35, U.S. Code (1952), sec. 266)

The invention described herein may be manufactured and used by or for the Government of the United States of America for governmental purposes without the payment of any royalties thereon or therefor.

This invention relates to glass compositions and more particularly to infrared transmitting glass compositions based on the $BaO$—$TiO_2$—$SiO_2$ ternary system.

Application of infrared transmitting glasses in the field of optics has become more prevalent and diversified due largely to the demands presented by military usages, such as in optical lenses for aerial photography equipment and fire control instruments. Stringent requirements of physical and chemical properties for infrared transmitting glasses have been made necessary due to the wide range of environmental factors surrounding practical applications of the devices which employ these glasses.

Research directed toward the development of serviceable glasses based on ternary systems, such as $K_2O$—$CaO$—$SiO_2$ and $K_2O$—$PbO$—$SiO_2$, has led to the discovery of commercial glasses which are fluid enough at an industrially accessible temperature to be melted on a commercial scale, viscous enough to be worked above its freezing point so that devitrification cannot take place, and glasses which have physical properties and chemical durability suitable for the purpose for which they are intended. However, studies made to lead to the production of special-type glasses capable of resisting chemical and physical change ordinarily brought about through exposure to extremes of heat and cold and corrosive chemicals have resulted in the finding of relatively few acceptable glasses, particularly those needed in the infrared transmitting ranges.

An object of the present invention is to provide infrared glasses of high refractive index.

Another object of the invention is the provision of infrared transmitting glasses having high deformation temperatures.

Another object is to provide glasses having good chemical durabilities such as resistance to attack over the entire pH range and low hygroscopicity.

A further object is to provide infrared glasses of a composition which enables the glass to be cooled from a molten state without crystallization.

A still further object of the invention is the provision of a glass having good transmittances in the near infrared at wave lengths below five microns.

Another object is to provide glass compositions based on the $BaO$—$TiO_2$—$SiO_2$ ternary system which may be formed in relatively large amount melts.

Other objects and many of the attendant advantages of this invention will be readily appreciated as the same becomes better understood by reference to the following detailed description when considered in connection with the accompanying drawings wherein.

Figure 1:
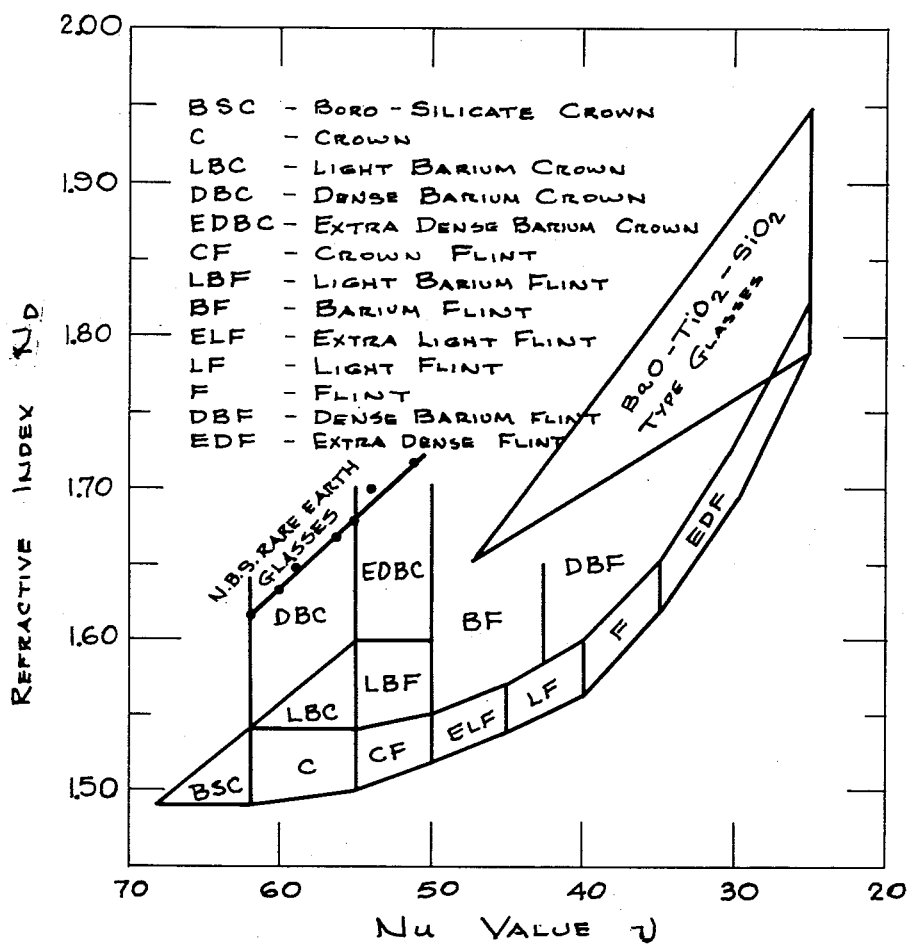
FIG. 1 is a graph illustrating refractive index $N_D$, versus Nu value of various crown and flint glasses in comparison with the $BaO$—$TiO_2$—$SiO_2$ type glasses of the present invention.

According to the present invention it has been found that multicomponent glasses having desirable characteristic properties may be developed from the ternary base glasses of the $BaO$—$TiO_2$—$SiO_2$ system. Not only has it been discovered that glasses comprising the present invention are feasible in their intended use in optical lens devices requiring infrared wave transmission, but also that the glasses may be prepared in large melts which factor contributes to mass production of the glasses in distinction to laboratory production of limited amounts.

Preferred glasses of the present invention containing $BaO$, $TiO_2$, and $SiO_2$ as the principal constituents have been found to have high refractive indices, good transmittances in the near infrared at wave lengths below five microns, high deformation temperatures, and good chemical durabilities. A considerable glass forming range has been accomplished in the ternary $BaO$—$TiO_2$—$SiO_2$ system, and it has been discovered that the refractive indices, $N_D$, of these glasses range from 1.631 to 1.880 with Nu values from 49.9 to 25.3. Further, considerable variation in transmittance has been noticed for the several glasses, but in general the glasses containing 15, 20, and 25 mole percent $TiO_2$ show the best transmittance in the region of 3.5 to 4.0 microns, the absorption band near 3.0 microns being the weakest for these glasses. Particular examples of glasses formed which includes the favorable properties above-noted are F138 and F40 each consisting of, in mole percent, $SiO_2$—40, $BaO$—30, $TiO_2$—30; and $SiO_2$—50, $BaO$—30, $TiO_2$—20, respectively. These glasses have the property of high refractive index, F-138, $N_D$ of 1.83697, and F-40, $N_D$ of 1.75412, with Nu values of 28.1 for F-138 and 34.3 for F-40.

The following is a table showing the transmittances of some glasses of the invention:

*Transmittances of base glasses for each series of oxides*

[Percent]

| Microns | F40 | F123 | F130 | F154 | F158 | F138 | F201 | F216 | F220 | F223 |
|---|---|---|---|---|---|---|---|---|---|---|
| 1.00 | 85.0 | 85.5 | 83.5 | 84.5 | 83.5 | 82.0 | 81.5 | 82.0 | 81.8 | 81.0 |
| 1.25 | 85.2 | 85.8 | 84.0 | 85.0 | 83.8 | 82.5 | 82.0 | 82.5 | 82.2 | 81.5 |
| 1.50 | 86.2 | 86.0 | 84.5 | 85.0 | 84.0 | 83.0 | 82.3 | 82.8 | 82.6 | 82.0 |
| 1.75 | 87.0 | 86.0 | 85.0 | 85.0 | 84.0 | 83.0 | 83.0 | 83.0 | 83.0 | 82.5 |
| 2.00 | 87.0 | 85.8 | 85.5 | 85.0 | 84.0 | 83.0 | 82.5 | 83.0 | 83.0 | 82.5 |
| 2.25 | 87.0 | 85.6 | 85.5 | 85.0 | 83.8 | 83.0 | 82.5 | 82.8 | 83.0 | 83.0 |
| 2.50 | 86.5 | 85.5 | 85.2 | 85.0 | 83.6 | 83.0 | 82.5 | 82.8 | 83.0 | 83.0 |
| 2.75 | 85.5 | 85.0 | 84.8 | 84.5 | 83.0 | 82.8 | 82.2 | 82.5 | 82.5 | 82.0 |
| 3.00 | 65.5 | 61.0 | 58.0 | 60.1 | 62.5 | 54.0 | 68.0 | 65.5 | 66.5 | 59.5 |
| 3.25 | 63.5 | 61.2 | 58.0 | 62.2 | 65.8 | 53.0 | 68.0 | 65.8 | 66.2 | 60.5 |
| 3.50 | 62.0 | 61.0 | 59.2 | 64.2 | 66.8 | 53.8 | 67.8 | 66.0 | 66.8 | 62.2 |
| 3.75 | 62.8 | 62.8 | 61.8 | 66.2 | 67.3 | 57.2 | 68.2 | 67.0 | 68.0 | 64.8 |
| 4.00 | 63.8 | 65.2 | 64.8 | 68.5 | 68.1 | 60.0 | 69.0 | 68.5 | 69.5 | 67.0 |
| 4.25 | 59.2 | 61.0 | 63.5 | 66.5 | 64.5 | 57.8 | 66.0 | 65.2 | 67.5 | 65.0 |
| 4.50 | 38.0 | 49.0 | 53.5 | 55.0 | 50.0 | 46.5 | 57.0 | 59.0 | 61.5 | 57.5 |
| 4.75 | 3.0 | 10.0 | 15.0 | 16.0 | 12.5 | 11.0 | 20.0 | 25.0 | 30.0 | 24.0 |
| 5.00 | 0.7 | 0.8 | 1.0 | 1.0 | 0.5 | 0.5 | 1.0 | 1.5 | 2.0 | 1.5 |

More broadly, representative glasses of the invention may be formed of the following oxides within the quantitative mole percentage ranges listed.

$SiO_2$ ------------ 35–60  $ThO_2$ ------------ 0–6
$BaO$ ------------ 15–35  $ZrO_2$ ------------ 0–8
$TiO_2$ ------------ 5–35  $Ta_2O_5$ ------------ 0–4
$La_2O_3$ ------------ 0–10  $Cb_2O_5$ ------------ 0–8
$PbO$ ------------ 0–15  $WO_3$ ------------ 0–4

It has been revealed by this invention that small amounts of other oxides, such as $Na_2O$, $K_2O$, $CaO$, $SrO$, $ZnO$, $CdO$, $TeO_2$, and $Al_2O_3$, also may be included as glass components, although the presence of moderate to large amounts of some of these oxides, particularly $Na_2O$ and $K_2O$, materially impair the infrared transmittance and lower the deformation temperature of the resulting glasses.

Specific glasses of the ternary system $BaO$—$TiO_2$—$SiO_2$ derived from the above-listed oxides within their given mole percentage ranges are represented in Table I, below, and are expressed in mole percentage. It is upon the glasses of Table I that oxide series of glasses have been discovered, and these series will be explained more in detail hereinafter.

By referring to FIG. 1, it can be seen that representative glasses of the invention have refractive indices comparable to the extra dense flints, and Nu values somewhat higher.

As is well-known in the art of glass making, extra dense flint glasses have PbO as a major constituent, and, consequently, are not chemically durable. For example, one type of antireflection coating applied in alkaline solution cannot be used on glasses with high PbO contents, since the resistance to attack by alkaline solutions is poor. In contradistinction, the glasses provided by this invention have a high chemical stability inasmuch as the PbO content is low, and yet the resultant glasses compare favorably to the physical properties of the extra dense flint glasses.

It is also notable that known high refractive index glasses usually contain appreciable amounts of boron oxide. Glasses of this nature have little or no transmittance beyond wave lengths of 2.9 microns whereas glasses described herein contain no $B_2O_3$, and the transmittances extend beyond wave lengths of 2.9 microns, thus making the glasses of this invention suitable for infrared transmittance purposes. The transmittance properties of several glasses typical of the present invention are plotted in FIG. 2 for 2 mm. thicknesses of the glasses.

Figure 3:
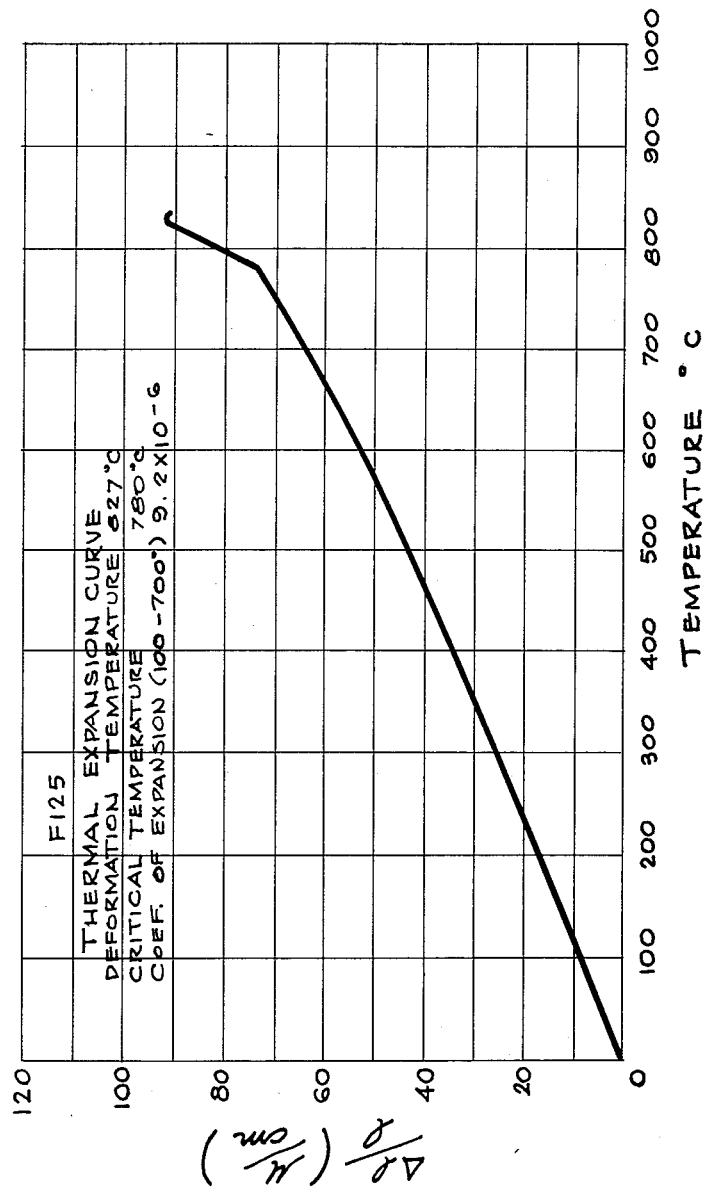
FIG. 3 illustrates a thermal expansion curve of one member of the glasses comprising the invention.

The deformation temperatures, as determined by the thermal expansion method, of exemplary glasses of the invention generally range from 767° C. to 840° C. For purposes of illustration, the thermal expansion curve for glass F125 is given in FIG. 3. It is important to note that the deformation temperature of 827° C. is well above that of extra dense flint glass of comparable refractive index, and is well above the deformation temperatures of most commercial types of glass.

Figure 2:
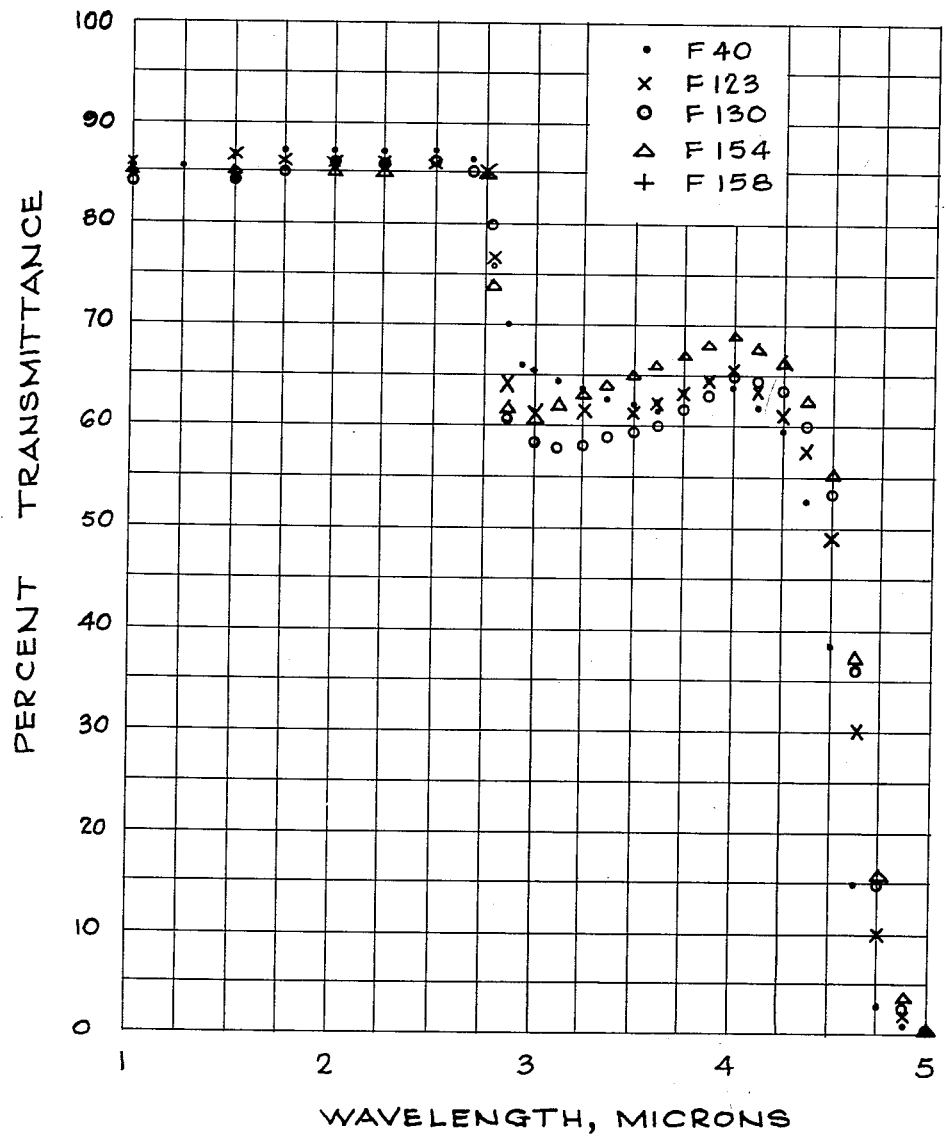
FIG. 2 shows the transmittance property curves for 2 mm. thicknesses of representative glasses of the invention.

Transmittances of the base glasses of Table I on which are formed oxide series are shown in FIG. 2. It readily can be appreciated that a considerable glass forming range is covered in the ternary $BaO$—$TiO_2$—$SiO_2$ system by reference to FIG. 2, as mentioned above.

The chemical durabilities of the glasses above-noted were determined by an interferometric method. A polished sample of each glass was immersed about one half its length in a solution buffered to the desired pH. After six hours exposure at 80° C. the samples were viewed through an optical flat with the aid of monochromatic light. Inasmuch as any shifts in the interference bands as they passed from the unexposed to the exposed portion of the sample were proportional to the amount of attack by the buffering media, a measure of chemical durability of the sample was accurately determined. The results of tests on the samples noted in Table I of $BaO$—$TiO_2$—$SiO_2$ type glasses are given in the following Table II. It is noteworthy that seven glasses, F48, F64, F62, F65, F158, F161, F223, F232, all of which contain either $Ta_2O_5$ or $ZrO_2$, or both, show no detectable attack over the entire pH range from pH 2 to pH 12.

TABLE I

*Base glasses for various oxide series*

|  | F40 | F123 | F130 | F154 | F158 | F138 | F201 | F216 | F220 | F223 |
|---|---|---|---|---|---|---|---|---|---|---|
| $SiO_2$ | 50 | 50 | 45 | 45 | 44 | 40 | 40 | 37 | 36 | 36 |
| $BaO$ | 30 | 23 | 23 | 19 | 19 | 30 | 23 | 23 | 23 | 20 |
| $TiO_2$ | 20 | 20 | 20 | 20 | 20 | 30 | 30 | 30 | 30 | 30 |
| $La_2O_3$ |  | 7 | 7 | 7 | 7 |  | 7 | 7 | 7 | 7 |
| $ZrO_2$ |  |  | 5 | 5 | 5 |  |  | 3 | 3 | 3 |
| $ThO_2$ |  |  |  |  | 4 | 4 |  |  |  | 3 |
| $Ta_2O_5$ |  |  |  |  |  |  |  |  | 1 | 1 |
| Composition range of Oxide substitution |  | $La_2O_3$ 0–10 | $ZrO_2$ 0–8 | $ThO_2$ 0–6 | $Ta_2O_5$ 0–5 |  | $La_2O_3$ 0–12 | $ZrO_2$ 0–6 | $Ta_2O_5$ 0–3 | $ThO_2$ 0–6 |
| $N_D$ | 1.75 | 1.80 | 1.83 | 1.84 | 1.85 | 1.84 | 1.87 | 1.89 | 1.90 | 1.91 |
| $\nu$ | 34.3 | 34.2 | 33.2 | 33.0 | 32.7 | 28.1 | 28.7 | 28.3 | 28.3 | 27.9 |

TABLE II

*Hygroscopicity and chemical durability of BaO—TiO$_2$—SiO$_2$ glasses*

| Melt No. | Water sorbed 1 hr. mg./cm.$^3$ | 2 hr. mg./cm.$^3$ | Surface alteration, fringes, at pH (exposures, 6 hr. at 80° C.) | | | | | |
|---|---|---|---|---|---|---|---|---|
| | | | 2.0 | 4.1 | 6.0 | 8.2 | 10.2 | 11.8 |
| F-35 | 5.7 | 10.0 | [1] ND | ND | ND | ND | [2] 0.5A | 2A |
| F-49 | 6.1 | 9.1 | ND | ND | ND | ND | ND | 0.2A |
| F-40 | 5.2 | 8.2 | 0.1A | ND | ND | ND | ND | ND |
| F138 | 3.5 | 8.0 | [3] 0.1S | ND | ND | ND | ND | ND |
| F48 | 6.2 | 7.9 | ND | ND | ND | ND | ND | ND |
| F62 | 4.0 | 7.2 | ND | ND | ND | ND | ND | ND |
| F64 | 5.3 | 8.1 | ND | ND | ND | ND | ND | ND |
| F65 | 4.7 | 8.1 | ND | ND | ND | ND | ND | ND |
| F158 | | | ND | ND | ND | ND | ND | ND |
| F161 | | | ND | ND | ND | ND | ND | ND |
| F223 | 5.5 | 13.5 | ND | ND | ND | ND | ND | ND |
| F232 | 5.0 | 11.0 | ND | ND | ND | ND | ND | ND |
| Fused SiO$_2$ | 6.2 | 12.1 | ND | ND | ND | ND | [4] DA | 0.5A |
| Corning 7740 | 15.9 | 28.3 | ND | ND | ND | DA | 0.25A | 1.75A |

[1] ND, no detectable attack.
[2] A, attack of surface.
[3] S, swelling of surface.
[4] DA, detectable but not measurable attack.

References: Hubbard, Donald and Hamilton, Edgar H. "Studies of the Chemical Durability of Glass by an Interferometric Method," J. Res., NBS 27, 143 (1941) RP 1409. Hubbard, Donald, "Hygroscopicity of Optical Glasses an as Indicator of Serviceability," J. Res. NBS, 36, 365(1946) RP 1706.

The hygroscopicity, or tendency of a powdered glass sample to absorb water, is also shown in the above Table II. The values obtained are, in all cases with the exception of F223 in the 2 hr. column, equal to or lower than fused SiO$_2$ which was used for purposes of comparison.

The resistance of these glasses to chemical attack over the entire pH range and their low hygroscopicity make them unique as compared to commercial types of glass.

Variations of the ternary base glasses F40 and F138 having desirable characteristics are given in the following Tables III and IV.

TABLE III

*Ternary BaO—TiO$_2$—SiO$_2$ glasses*

[Compositions in mole percent]

| | F145 | F146 | F147 | F148 | F149 | F150 | F151 |
|---|---|---|---|---|---|---|---|
| SiO$_2$ | 40 | 45 | 50 | 55 | 60 | 65 | 70 |
| BaO | 25 | 25 | 25 | 25 | 25 | 25 | 25 |
| TiO$_2$ | 35 | 30 | 25 | 20 | 15 | 10 | 5 |
| N$_D$ | 1.86682 | 1.82236 | 1.77760 | 1.73021 | ([1]) | ([2]) | ([2]) |
| ν | 25.3 | 27.6 | 30.6 | 34.0 | ([1]) | ([2]) | ([2]) |

| | F139 | F138 | F95 | F40 | F49 | F35 | F152 |
|---|---|---|---|---|---|---|---|
| SiO$_2$ | 35 | 40 | 45 | 50 | 55 | 60 | 65 |
| BaO | 30 | 30 | 30 | 30 | 30 | 30 | 30 |
| TiO$_2$ | 35 | 30 | 25 | 20 | 15 | 10 | 5 |
| N$_D$ | 1.87998 | 1.83697 | 1.79585 | 1.75412 | 1.71276 | 1.67250 | 1.63139 |
| ν | 25.8 | 28.1 | 30.9 | 34.3 | 38.6 | 43.7 | 49.9 |

| | F140 | F141 | F142 | F143 | F144 |
|---|---|---|---|---|---|
| SiO$_2$ | 40 | 45 | 50 | 55 | 60 |
| BaO | 35 | 35 | 35 | 35 | 35 |
| TiO$_2$ | 25 | 20 | 15 | 10 | 5 |
| N$_D$ | ([2]) | ([2]) | 1.73037 | 1.69148 | 1.63399 |
| ν | ([2]) | ([2]) | 38.3 | 43.1 | 49.4 |

Note.—Liquidus temperatures above 1300° C.

La$_2$O$_3$ SERIES

| | F40 | F52 | F111 | F123 | F53 | F110 | F63 |
|---|---|---|---|---|---|---|---|
| SiO$_2$ | 50 | 50 | 50 | 50 | 50 | 50 | 50 |
| BaO | 30 | 26 | 24 | 23 | 22 | 20 | 18 |
| TiO$_2$ | 20 | 20 | 20 | 20 | 20 | 20 | 20 |
| La$_2$O$_3$ | | 4 | 6 | 7 | 8 | 10 | 12 |
| Liq. temp., degrees | >1,320 | 1,275 | 1,253 | 1,235 | 1,257 | >1,315 | >1,315 |
| N$_D$ | 1.75412 | 1.77778 | 1.78880 | 1.79670 | 1.80061 | 1.81052 | ([3]) |
| ν | 34.3 | 34.3 | 34.3 | 34.2 | 34.4 | 34.4 | ([3]) |

See footnotes at end of table.

*Table III*—Continued

ZrO₂ SERIES

|  | F123 | F124 | F125 | F130 | F126 | F127 | F128 |
|---|---|---|---|---|---|---|---|
| SiO₂ | 50 | 48 | 46 | 45 | 44 | 42 | 40 |
| BaO | 23 | 23 | 23 | 23 | 23 | 23 | 23 |
| TiO₂ | 20 | 20 | 20 | 20 | 20 | 20 | 20 |
| La₂O₃ | 7 | 7 | 7 | 7 | 7 | 7 | 7 |
| ZrO₂ | | 2 | 4 | 5 | 6 | 8 | 10 |
| Liq. temp., degrees | 1,235 | 1,230 | 1,217 | 1,215 | 1,227 | >1,302 | (²) |
| N_D | 1.79670 | 1.80760 | 1.81928 | 1.82531 | 1.83157 | 1.84304 | (²) |
| ν | 34.2 | 33.8 | 33.4 | 33.2 | 33.0 | 32.6 | (²) |

Ta₂O₅ SERIES

|  | F130 | F129 | F131 | F132 | F133 | F134 | F135 | F136 | F137 |
|---|---|---|---|---|---|---|---|---|---|
| SiO₂ | 45 | 45 | 45 | 45 | 45 | 45 | 44 | 43 | 42 |
| BaO | 23 | 22 | 21 | 20 | 19 | 18 | 23 | 23 | 23 |
| TiO₂ | 20 | 20 | 20 | 20 | 20 | 20 | 20 | 20 | 20 |
| La₂O₃ | 7 | 7 | 7 | 7 | 7 | 7 | 7 | 7 | 7 |
| ZrO₂ | 5 | 5 | 5 | 5 | 5 | 5 | 5 | 5 | 5 |
| Ta₂O₅ | | 1 | 2 | 3 | 4 | 5 | 1 | 2 | 3 |
| Liq. temp., degrees | 1,215 | 1,200 | 1,260 | >1,300 | | | 1,195 | 1,300 | >1,300 |
| N_D | 1.82531 | 1.83268 | 1.83939 | 1.84844 | 1.85551 | 1.86240 | 1.83872 | 1.84425 | 1.85547 |
| ν | 33.2 | 32.6 | 32.2 | 31.6 | 31.1 | 30.6 | 32.5 | 32.2 | 31.7 |

ThO₂ SERIES

|  | F153 | F154 | F155 | F158 |
|---|---|---|---|---|
| SiO₂ | 45 | 45 | 45 | 44 |
| BaO | 21 | 19 | 17 | 19 |
| TiO₂ | 20 | 20 | 20 | 20 |
| La₂O₃ | 7 | 7 | 7 | 7 |
| ZrO₂ | 5 | 5 | 5 | 5 |
| ThO₂ | 2 | 4 | 6 | 4 |
| Ta₂O₅ | | | | 1 |
| Liq. temp., degrees | 1,218 | 1,227 | >1,310 | |
| N_D | 1.83251 | 1.84051 | 1.84708 | 1.83034 |
| ν | 33.1 | 33.0 | 32.9 | 33.4 |

PbO—WO₃ SERIES

|  | F159 | F160 | F161 | F162 |
|---|---|---|---|---|
| SiO₂ | 45 | 44 | 43 | 42 |
| BaO | 20 | 19 | 18 | 17 |
| TiO₂ | 20 | 20 | 20 | 20 |
| La₂O₃ | 7 | 7 | 7 | 7 |
| ZrO₂ | 5 | 3 | 3 | 3 |
| ThO₂ | 3 | 3 | 3 | 3 |
| PbO | | 1 | 2 | 3 |
| WO₃ | | 1 | 2 | 3 |
| N_D | 1.83684 | 1.84905 | 1.86040 | 1.87384 |
| ν | 33.1 | 32.0 | 31.0 | 30.0 |
| Liq. temp., degrees | | | 1,220 | |

¹ Opal in center; trans. sample only.
² Devit. in mold.
³ Contained crystals.

Glass F40, containing in mole percent, SiO₂—50, BaO—30, and TiO₂—20, was chosen as the base glass for further substitutions for the series shown in Table III. This table includes the La₂O₃ series, the ZrO₂ series, the ThO₂ series, and the PbO—WO₃ series. In the La₂O₃ series transmittances of 71.5 percent were obtained on 2 mm. thick samples in the range of 3 to 4.1 microns. This is an outstandingly high value of transmittance.

As shown in Table IV, below, a series of glasses have been made based on the ternary glass F138, which contains in mole percent, SiO₂—40, BaO—30, TiO₂—30. The oxides substituted in the series are La₂O₃, ZrO₂, ThO₂, and Ta₂O₅.

TABLE IV

[Compositions in mole percent]

La₂O₃ SERIES

|  | F138 | F189 | F190 | F191 |
|---|---|---|---|---|
| SiO₂ | 40 | 40 | 40 | 40 |
| BaO | 30 | 28 | 26 | 24 |
| TiO₂ | 30 | 30 | 30 | 30 |
| La₂O₃ | | 2 | 4 | 6 |
| Liq. temp., °C | 1,350 | >1,303 | 1,294 | 1,266 |
| N_D | 1.83697 | 1.84841 | 1.85814 | 1.86677 |
| ν | 28.1 | 28.2 | 28.5 | 28.7 |

|  | F201 | F192 | F193 | F194 |
|---|---|---|---|---|
| SiO₂ | 40 | 40 | 40 | 40 |
| BaO | 23 | 22 | 20 | 18 |
| TiO₂ | 30 | 30 | 30 | 30 |
| La₂O₃ | 7 | 8 | 10 | 12 |
| Liq. temp., °C | 1,242 | 1,263 | 1,315 | >1,320 |
| N_D | 1.87393 | 1.87736 | 1.88736 | 1.89477 |
| ν | 28.7 | 28.9 | 29.0 | 29.3 |

ZrO₂ SERIES

|  | F201 | F198 | F216 | F199 | F208 | F200 |
|---|---|---|---|---|---|---|
| SiO₂ | 40 | 38 | 37 | 36 | 35 | 34 |
| BaO | 23 | 23 | 23 | 23 | 23 | 23 |
| TiO₂ | 30 | 30 | 30 | 30 | 30 | 30 |
| La₂O₃ | 7 | 7 | 7 | 7 | 7 | 7 |
| ZrO₂ | | 2 | 3 | 4 | 5 | 6 |
| Liq. temp., °C | 1,242 | 1,238 | 1,212 | 1,250 | | 1,279 |
| N_D | 1.87393 | 1.8861 | 1.8901 | 1.89748 | 1.9028 | 1.90812 |
| ν | 28.7 | 28.4 | 28.3 | 28.2 | 28.1 | 28.0 |

ThO₂ SERIES

|  | F216 | F217 | F218 | F219 |
|---|---|---|---|---|
| SiO₂ | 37 | 37 | 37 | 37 |
| BaO | 23 | 21 | 19 | 17 |
| TiO₂ | 30 | 30 | 30 | 30 |
| La₂O₃ | 7 | 7 | 7 | 7 |
| ZrO₂ | 3 | 3 | 3 | 3 |
| ThO₂ | | 2 | 4 | 6 |
| Liq. temp., °C | 1,212 | 1,260 | 1,250 | >1,350 |
| N_D | 1.89011 | 1.89950 | 1.90754 | 1.91661 |
| ν | 28.3 | 28.2 | 28.2 | 28.1 |

Ta₂O₅ SERIES

|  | F216 | F220 | F221 | F222 |
|---|---|---|---|---|
| SiO₂ | 37 | 36 | 35 | 34 |
| BaO | 23 | 23 | 23 | 23 |
| TiO₂ | 30 | 30 | 30 | 30 |
| La₂O₃ | 7 | 7 | 7 | 7 |
| ZrO₂ | 3 | 3 | 3 | 3 |
| Ta₂O₅ |  | 1 | 2 | 3 |
| Liq. temp., °C | 1,212 | 1,260 | 1,330 | >1,350 |
| $N_D$ | 1.89011 | 1.90373 | 1.91074 | 1.92099 |
| ν | 28.3 | 28.3 | 27.7 | 27.4 |

Figure 4:
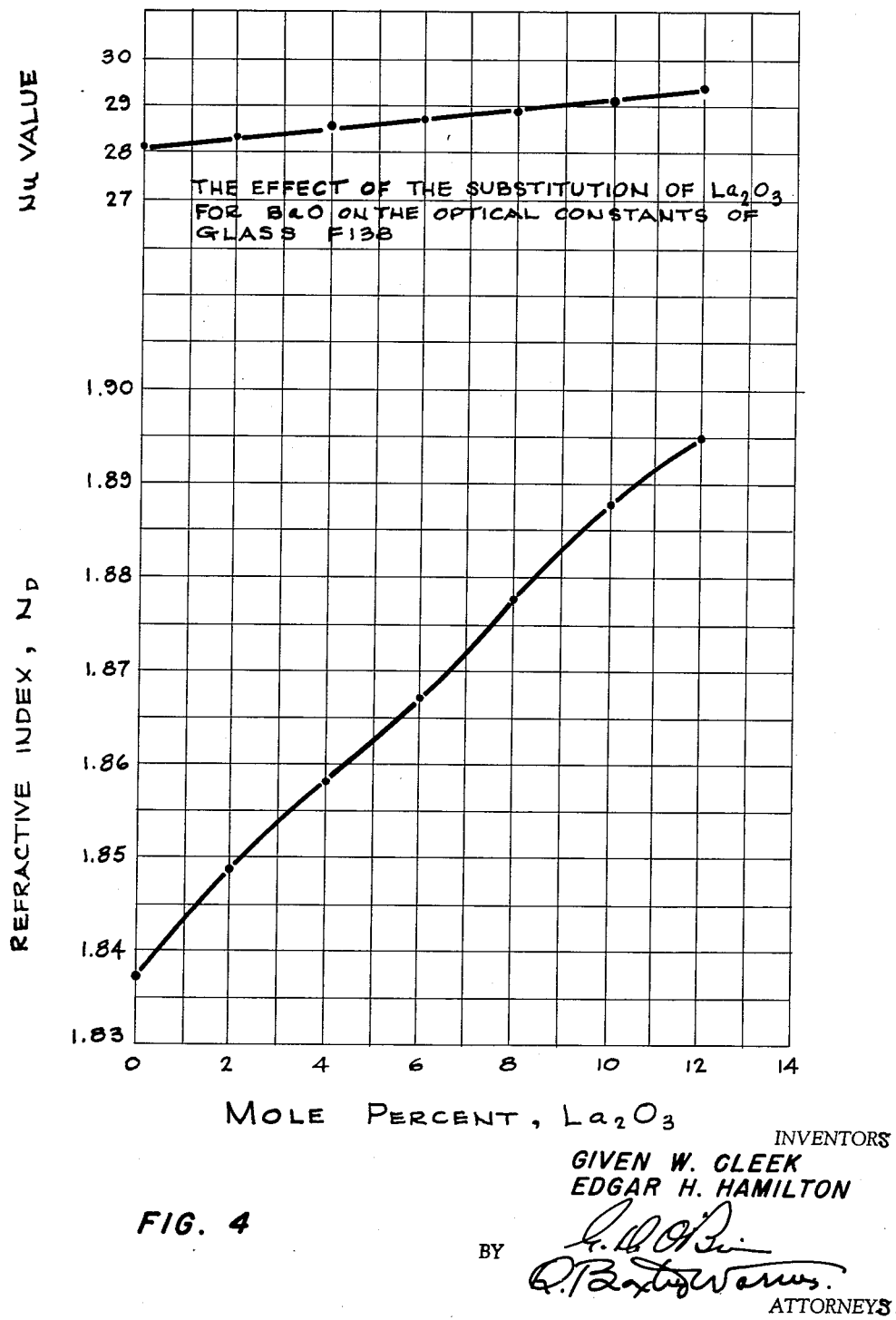
FIG. 4 is a graph showing the Nu values and refractive index, $N_D$, of the $La_2O_3$ series of the base glass F138.

FIG. 4 shows the effect on $N_D$ and Nu for the substitution of La₂O₃ for BaO in glass F138. The substitution gives the unusual result of increasing the refractive index and, at the same time, increasing the Nu value. This is a significant result when it is considered that most substitutions that cause an increase in refractive index normally produce a decrease in Nu value.

Figure 5:
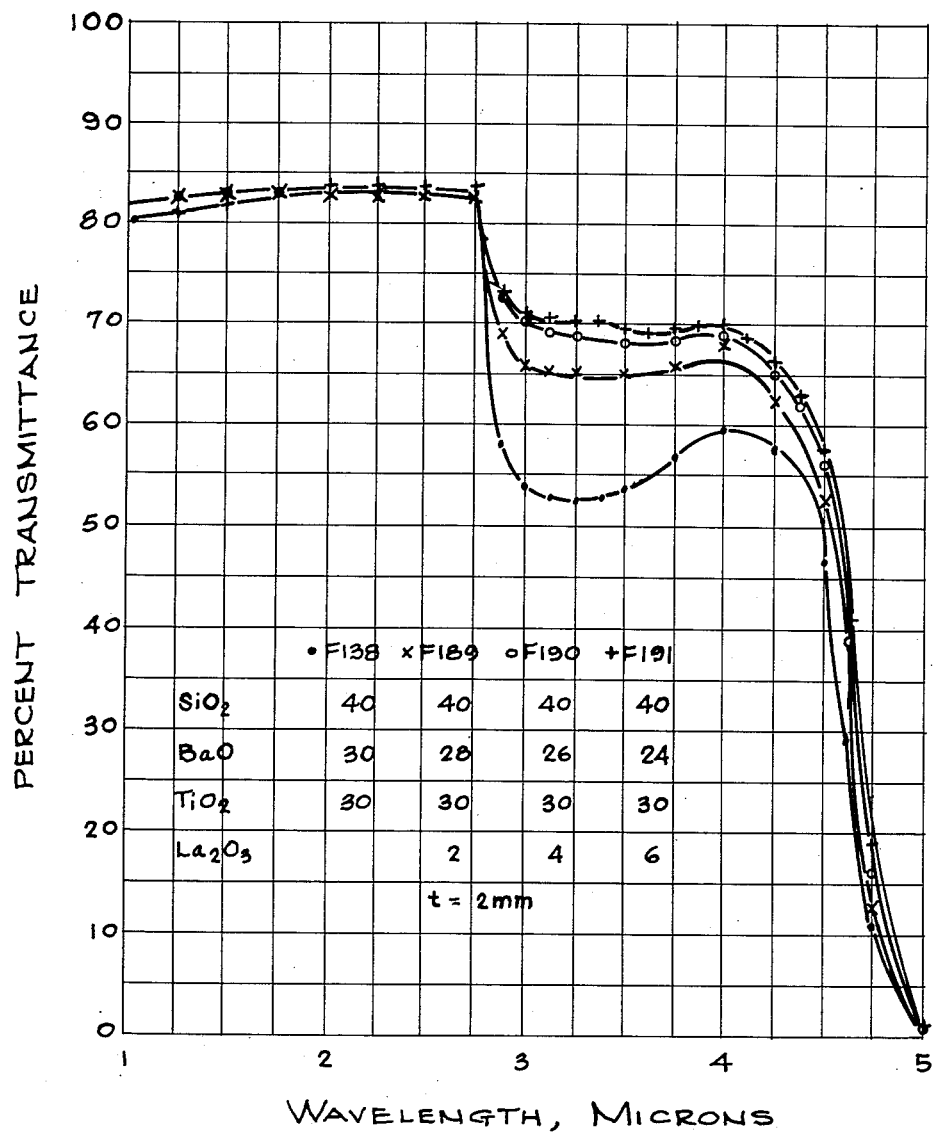
FIGS. 5 and 6 illustrate the transmittance curves of 2 mm. thicknesses of glasses in one series of glasses of the invention.
Figure 6:
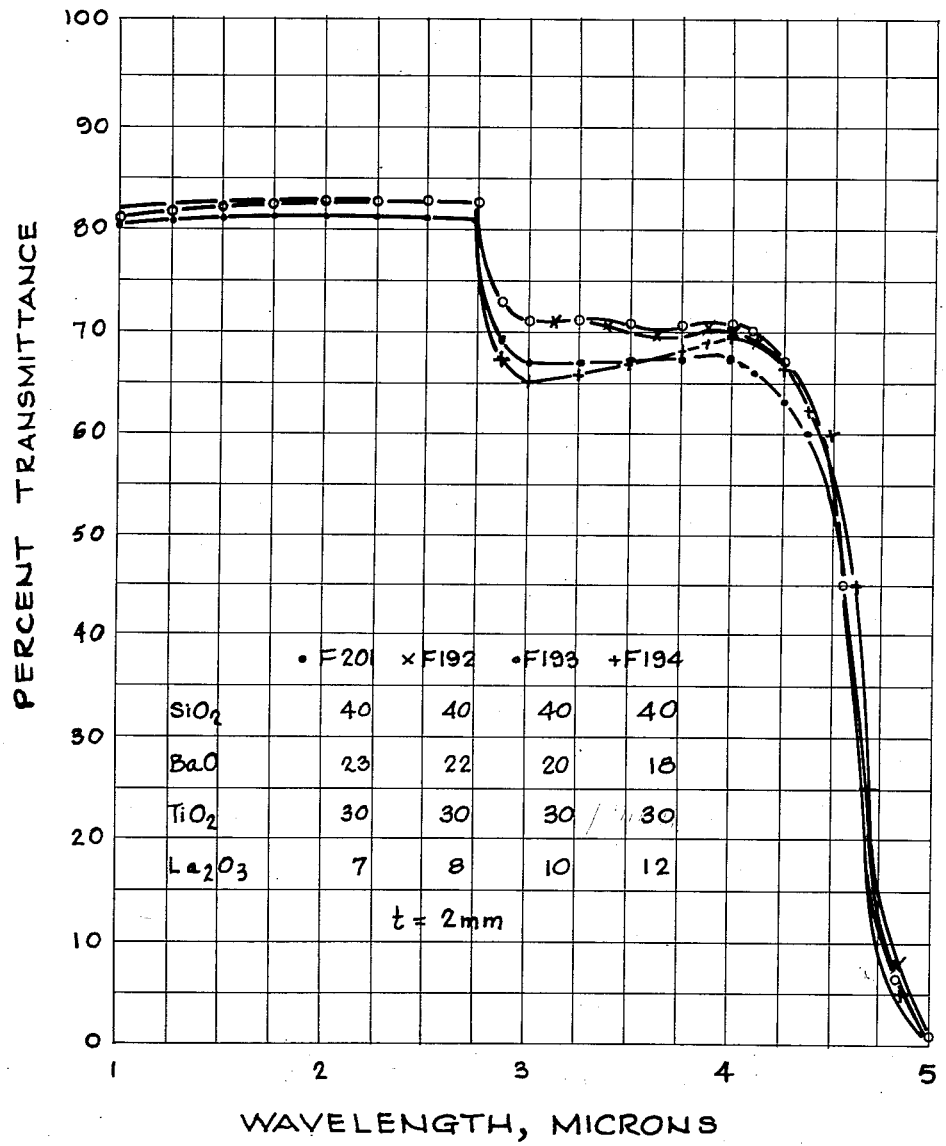

The transmittance of 2 mm. thickness of glasses in the La₂O₃ series are given in FIGS. 5 and 6. The transmittance in the 3.0 to 4.25 micron wave length region generally increases as the La₂O₃ content of the glasses is increased.

Figure 7:
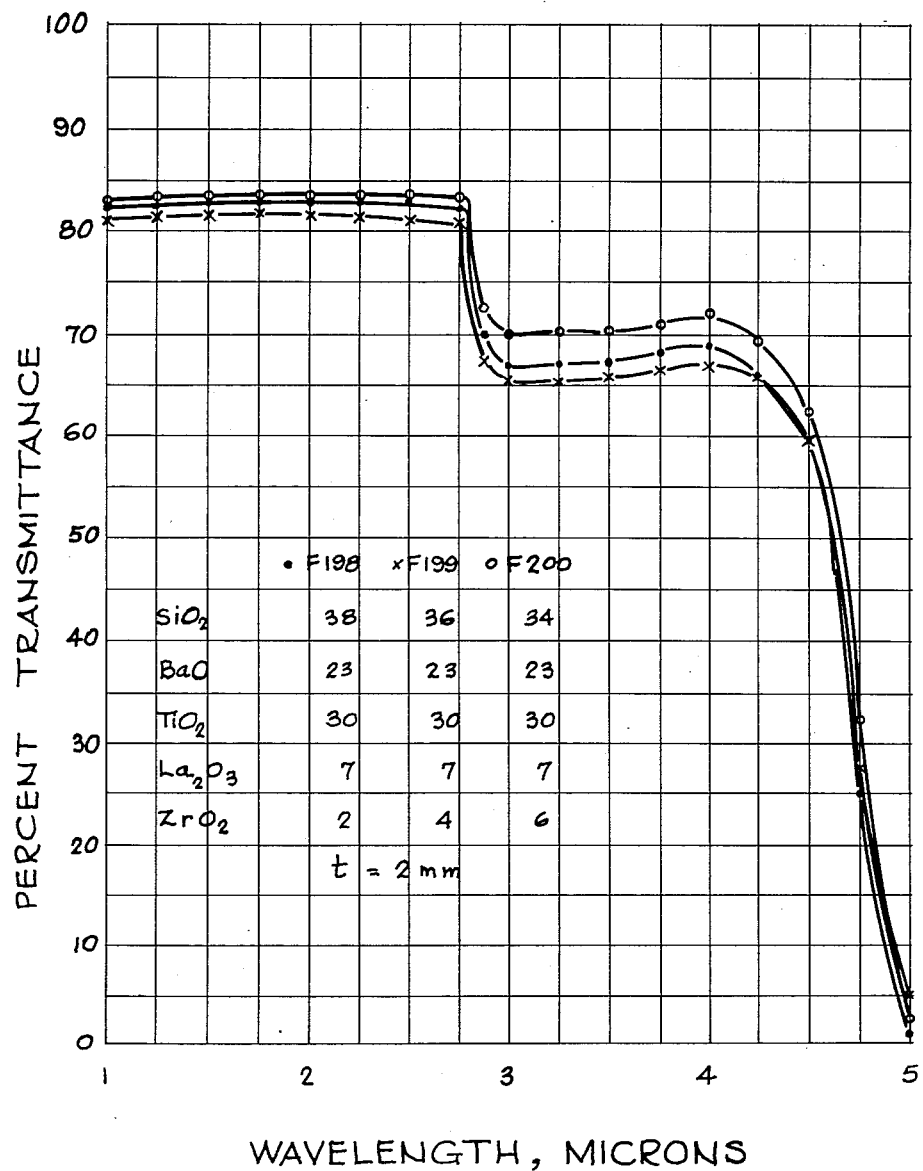
FIG. 7 shows the transmittance curves for 2 mm. thicknesses of three glasses in the $ZrO_2$ series of the invention.
Figure 8:
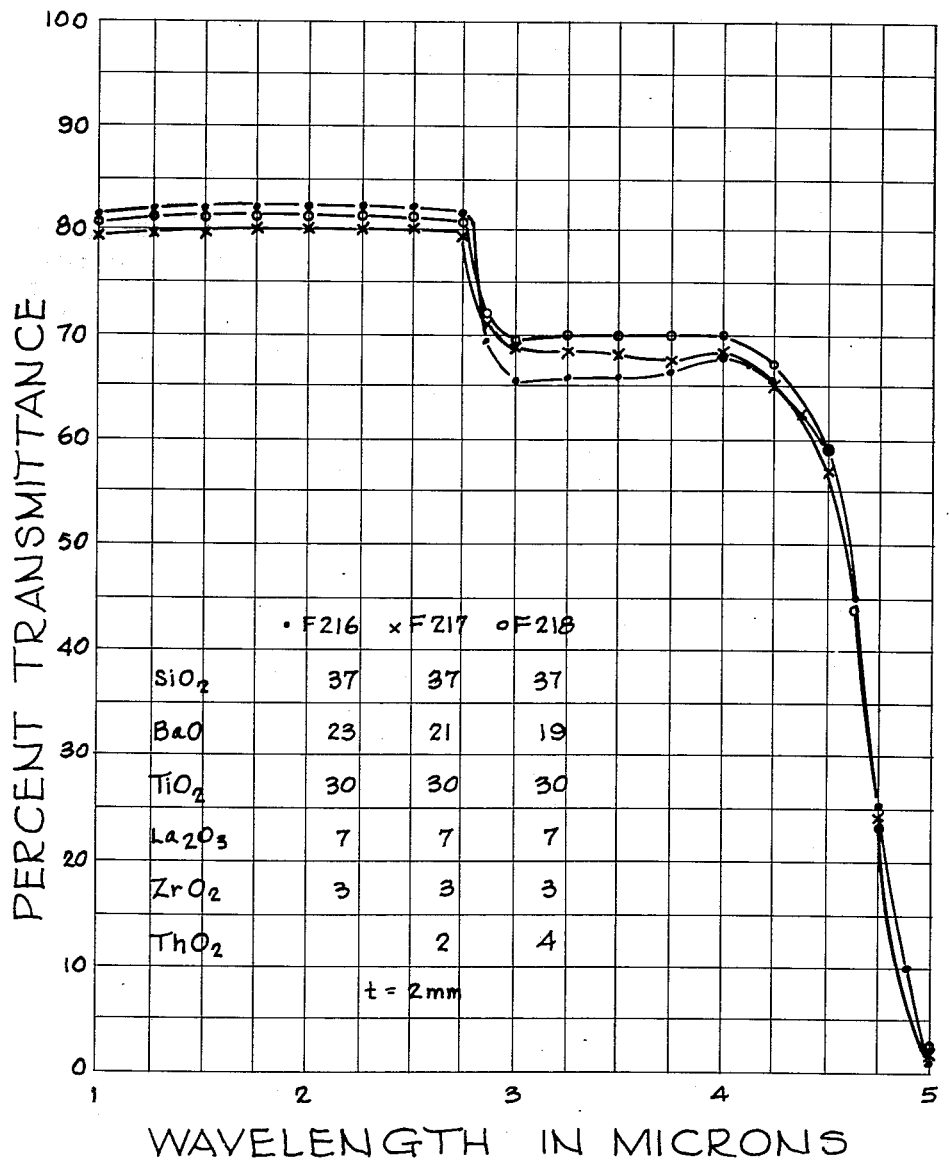
FIG. 8 illustrates transmittance curves for 2 mm. thicknesses of two glasses in the $ThO_2$ series of the invention.

In the ZrO₂ series, shown plotted in FIG. 7, the transmittances vary somewhat with composition, but all of them remain between 65 and 70% from 3.0 to 4.25 microns. Transmittances for glasses F217 and F218 in the ThO₂ series are plotted in FIG. 8.

In the ThO₂ series, ThO₂ was substituted for BaO; and in the Ta₂O₅ series, Ta₂O₅ was substituted for SiO₂. The refractive index, $N_D$, increases faster for the Ta₂O₅ substitution than for the ThO₂ substitution; however, it has been found that the liquidus temperature increases very rapidly with the Ta₂O₅ substitution and for practical purposes one mole percent of Ta₂O₅ is about the limit that can be used.

The compositions, liquidus temperatures, refractive indices, $N_D$ and Nu values of glasses which are variations of the Ta₂O₅ and ThO₂ series listed in Table IV are given in the following table:

TABLE V

[Compositions in mole percent]

|  | F220 | F223 | F224 | F231 |
|---|---|---|---|---|
| SiO₂ | 36 | 36 | 35 | 36 |
| BaO | 23 | 20 | 20 | 19 |
| TiO₂ | 30 | 30 | 30 | 30 |
| La₂O₃ | 7 | 7 | 7 | 7 |
| ZrO₂ | 3 | 3 | 3 | 3 |
| Ta₂O₅ | 1 | 1 | 2 |  |
| ThO₂ |  |  | 3 | 3 |
| PbO |  |  |  | 1 |
| WO₃ |  |  |  | 1 |
| GeO₂ |  |  |  |  |
| Liq. Temp., °C | 1,260 | 1,253 | 1,320 |  |
| $N_D$ | 1.90373 | 1.91400 | 1.92752 | 1.91665 |
| ν | 28.3 | 27.9 | 27.5 | 27.3 |

|  | F232 | F233 | F234 | F235 |
|---|---|---|---|---|
| SiO₂ | 35 | 34 |  |  |
| BaO | 18 | 18 | 20 | 18 |
| TiO₂ | 30 | 30 | 30 | 30 |
| La₂O₃ | 7 | 7 | 7 | 7 |
| ZrO₂ | 3 | 3 | 3 | 3 |
| Ta₂O₅ |  | 1 | 1 |  |
| ThO₂ | 3 | 3 | 3 |  |
| PbO | 2 | 2 | 2 |  |
| WO₃ | 2 | 2 | 2 |  |
| GeO₂ |  |  | 36 | 35 |
| Liq. Temp., °C | 1,260 |  | 1,233 | 1,220 |
| $N_D$ | 1.93011 | 1.94687 | 1.97552 | 1.99284 |
| ν | 26.6 | 25.9 | 26.1 | 25.0 |

It is important to note that all of the glasses have refractive indices, $N_D$, above 1.90, and as such are comparable to the refractive index of a high PbO content glass A2059. The deformation temperature of both glasses F223 and F232 is above 800° C. as compared to 425° C. for glass A2059.

Figure 9:
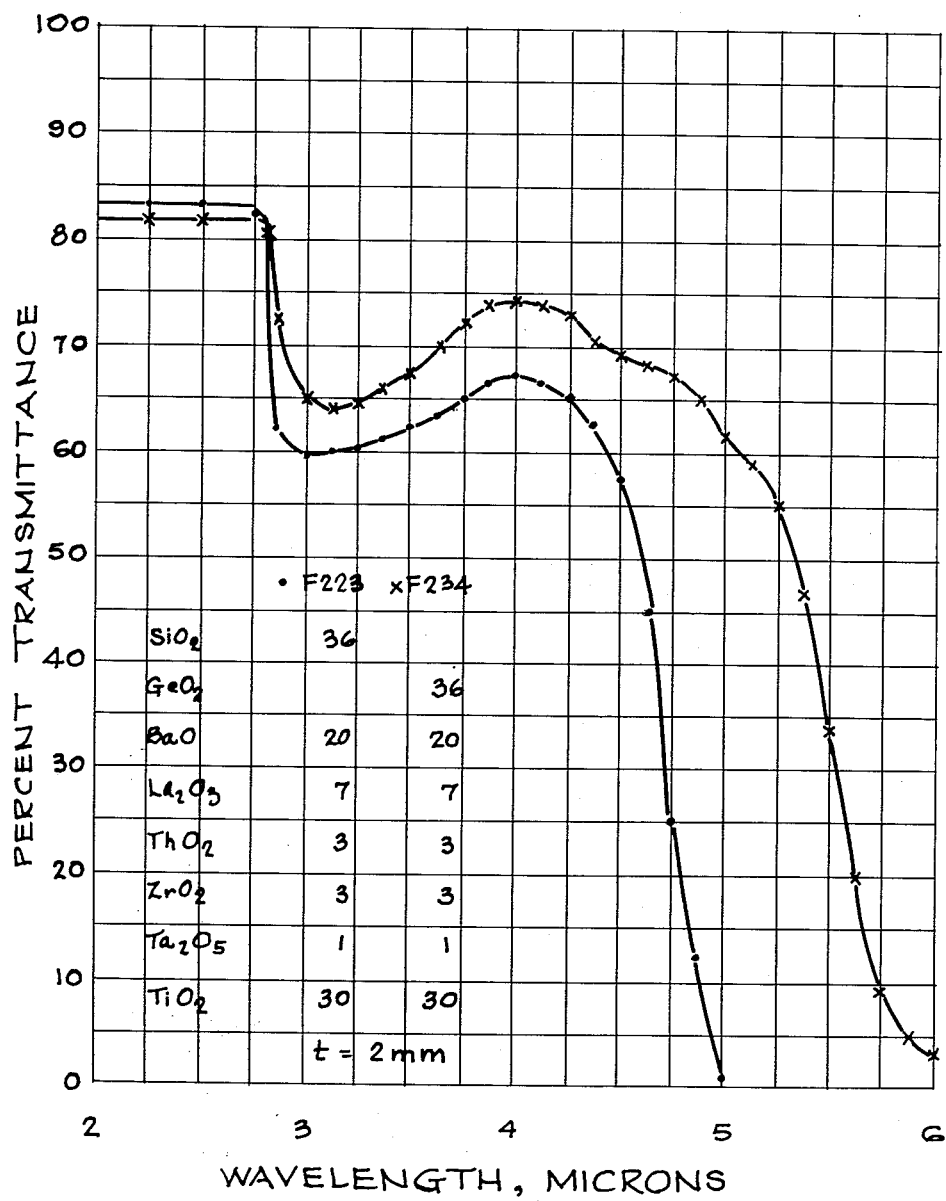
FIGS. 9 and 10 show transmittance curves for 2 mm. thicknesses of glasses based on the $Ta_2O_5$ and $ThO_2$ series glasses of the invention.
Figure 10:
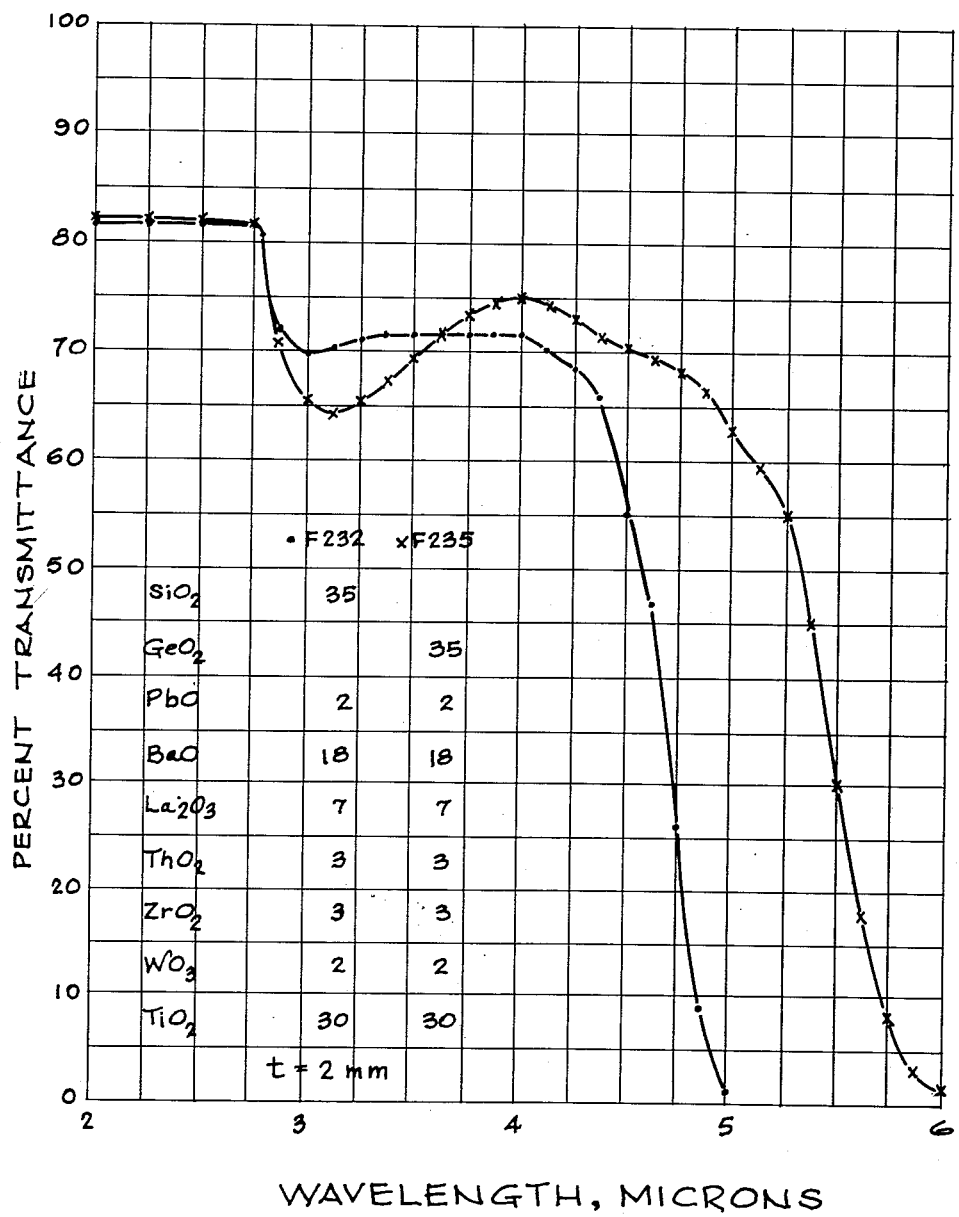

Two glasses of the invention, F234 and F235 of Table V, are germanate glasses. The only difference between the germanate glasses and glasses F223 and F232 of Table II is that SiO₂ has been completely replaced with GeO₂. The refractive indices, $N_D$, are appreciably higher than for the silicate glasses. The transmittance of 2 mm. thicknesses of F223 and F234 and similar data for F232 and F235 are shown in FIGS. 9 and 10, respectively. Due to the high cost of GeO₂, about $150.00 a pound at the present time, large melts of F234 and F235 have not been attempted. However, based on the experiences with F223 and F232, it is believed that these glasses could be made in at least 6000 gram melts without devitrification troubles. More specifically, the glasses F223 and F232 have been produced in 6000 gram melts and cooled without devitrification into slabs of relatively large dimensions; i.e., 12" x 6½" x 2". Also, it has been found by this invention that other glass compositions, such as multicomponent glasses F158 and F161 of Table III above which were developed from the ternary base glasses, can be made successfully in 6000 gram melts and cooled without devitrification. These glasses also have the desirable properties of the glasses hereinbefore mentioned.

Figure 11:
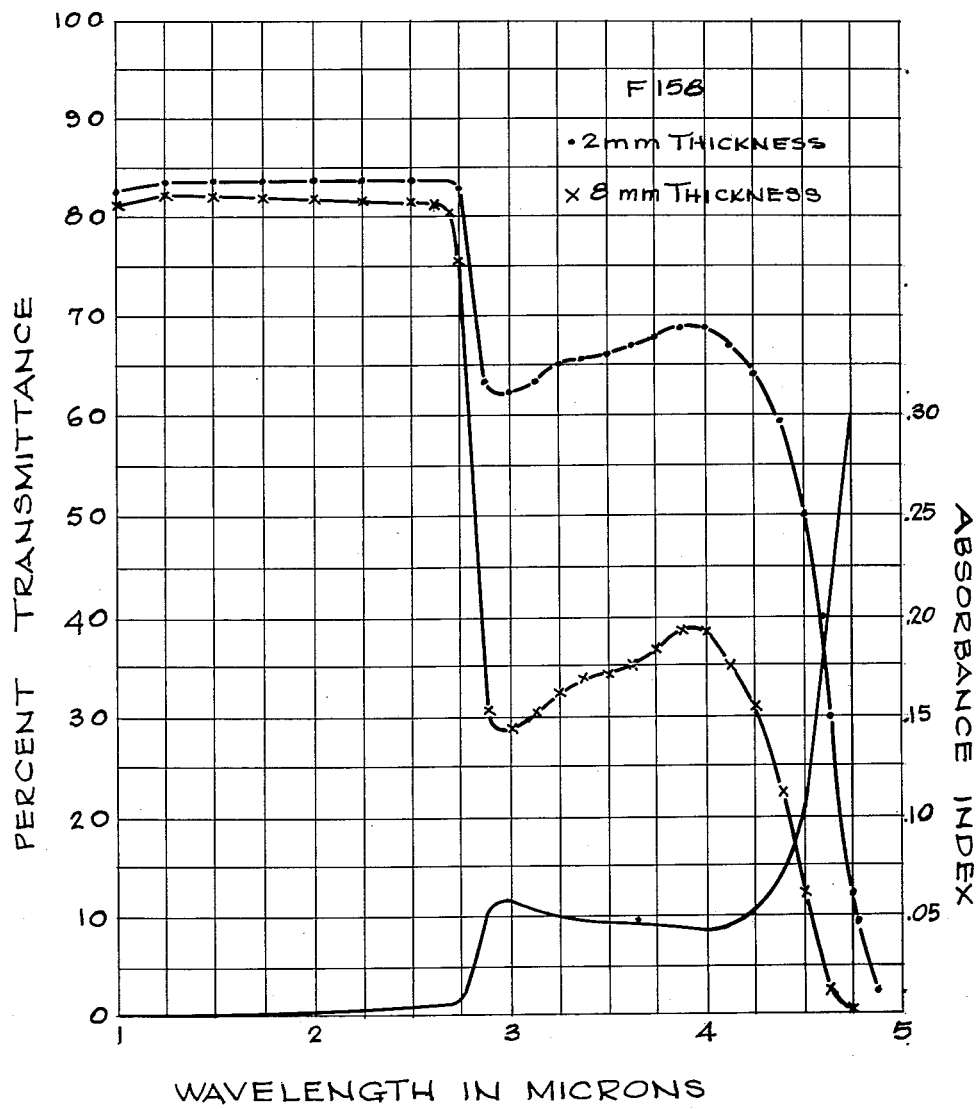
FIG. 11 illustrates transmittance curves for a 2 mm. thickness and an 8 mm. thickness of glass F158 which comprises a part of the invention.
Figure 12:
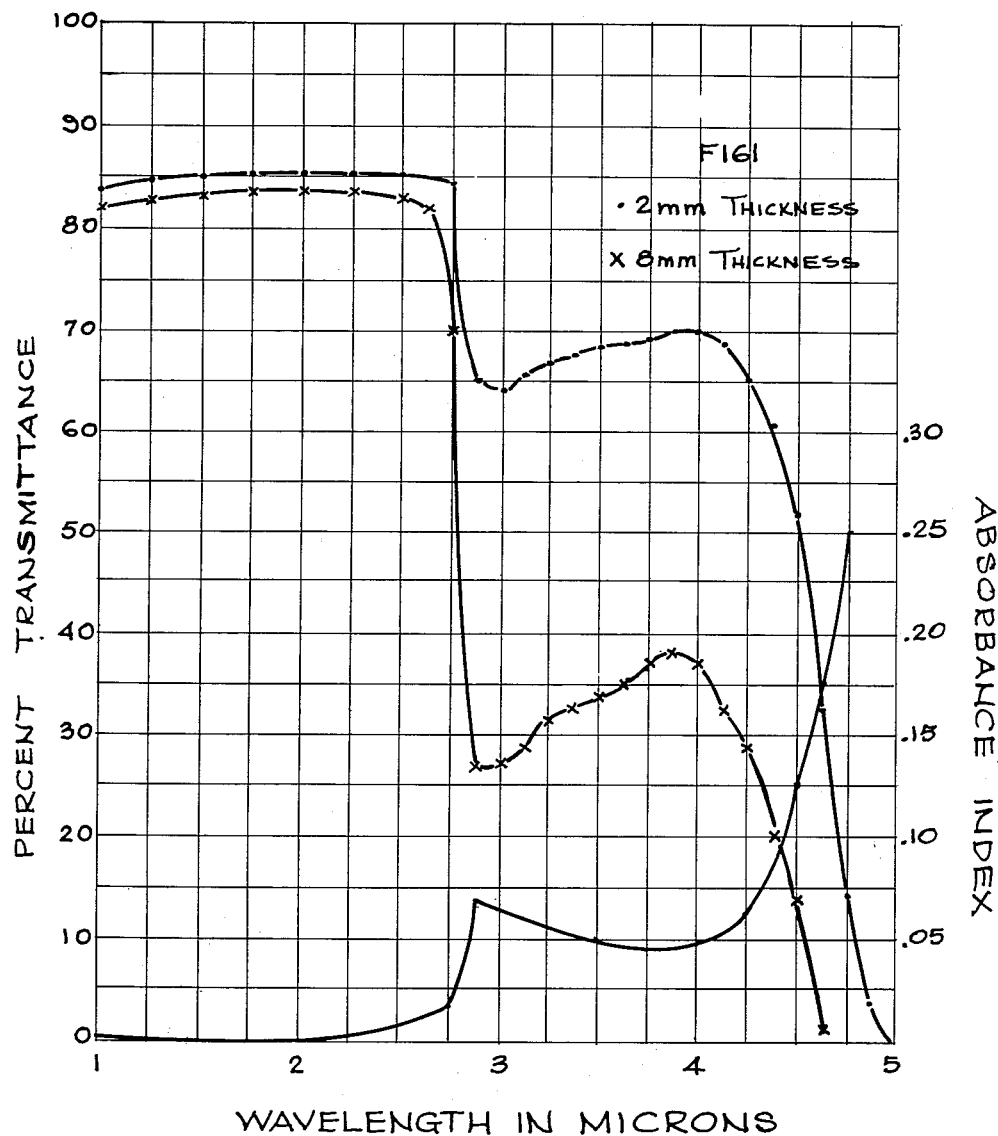
FIG. 12 illustrates transmittance curves for 2 mm. and 8 mm. thicknesses of glass F161 of the invention.
Figure 13:
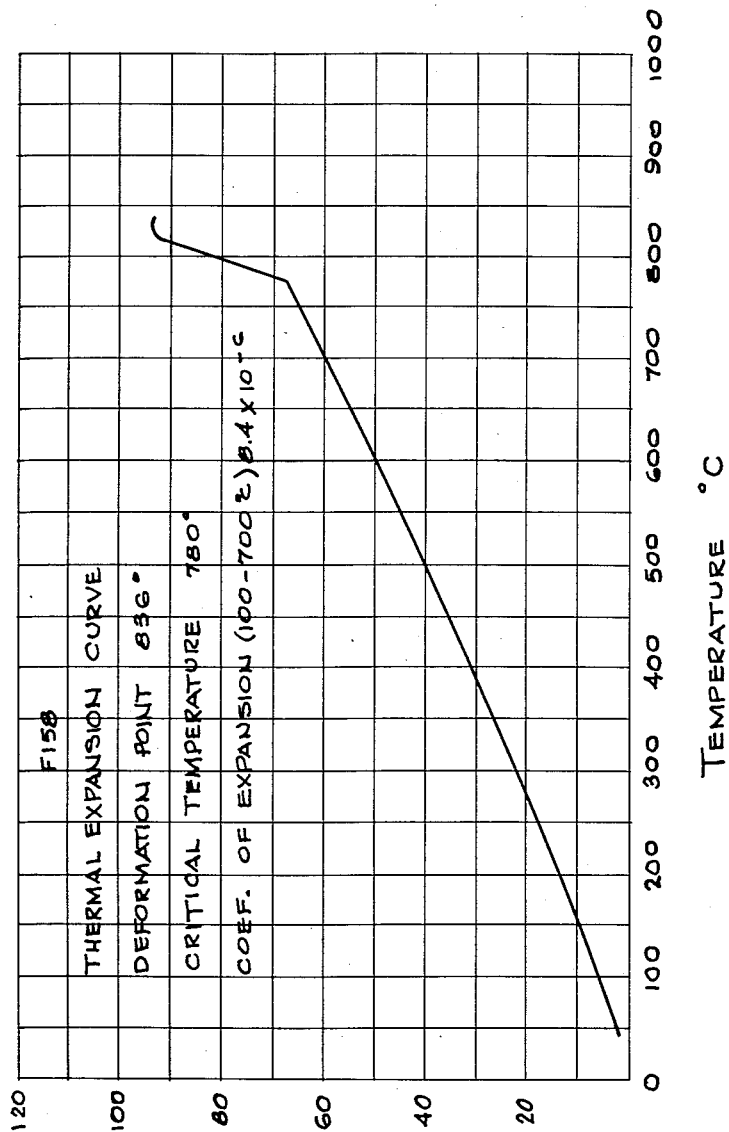
FIGS. 13 and 14 are the thermal expansion curves for two glasses developed from the ternary base glasses.
Figure 14:
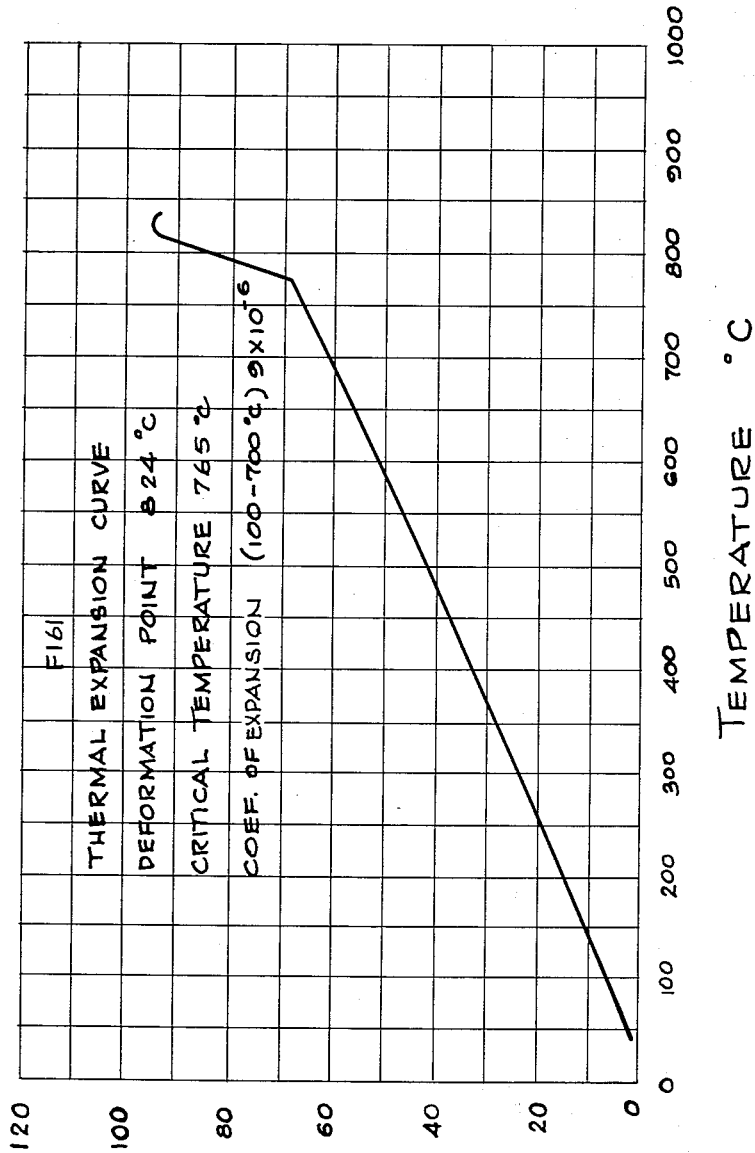

The transmittance of 2 and 8 mm. thicknesses and the calculated absorbance indices for F158 and F161 are given in FIGS. 11 and 12, respectively, and the linear thermal expansion curves for the two glasses are given in FIGS. 13 and 14.

It has been found that glasses of the BaO—TiO₂—SiO₂ type have high values of elastic moduli as compared to standard types of glasses. For example, the room temperature values of F158 and F161 and their comparison with some well-known glasses are as follows:

TABLE VI

|  | Young's modulus, kilobars | Shear modulus, kilobars | Poisson's ratio |
|---|---|---|---|
| F158 | 1,065 | 417 | 0.275 |
| F161 | 1,032 | 401 | .287 |
| BSC 517 | 802 | 334 | .201 |
| Fused SiO₂ | 730 | 314 | .165 |
| Corning Pyrex 7740 | 612 | 255 | .194 |

Figure 15:
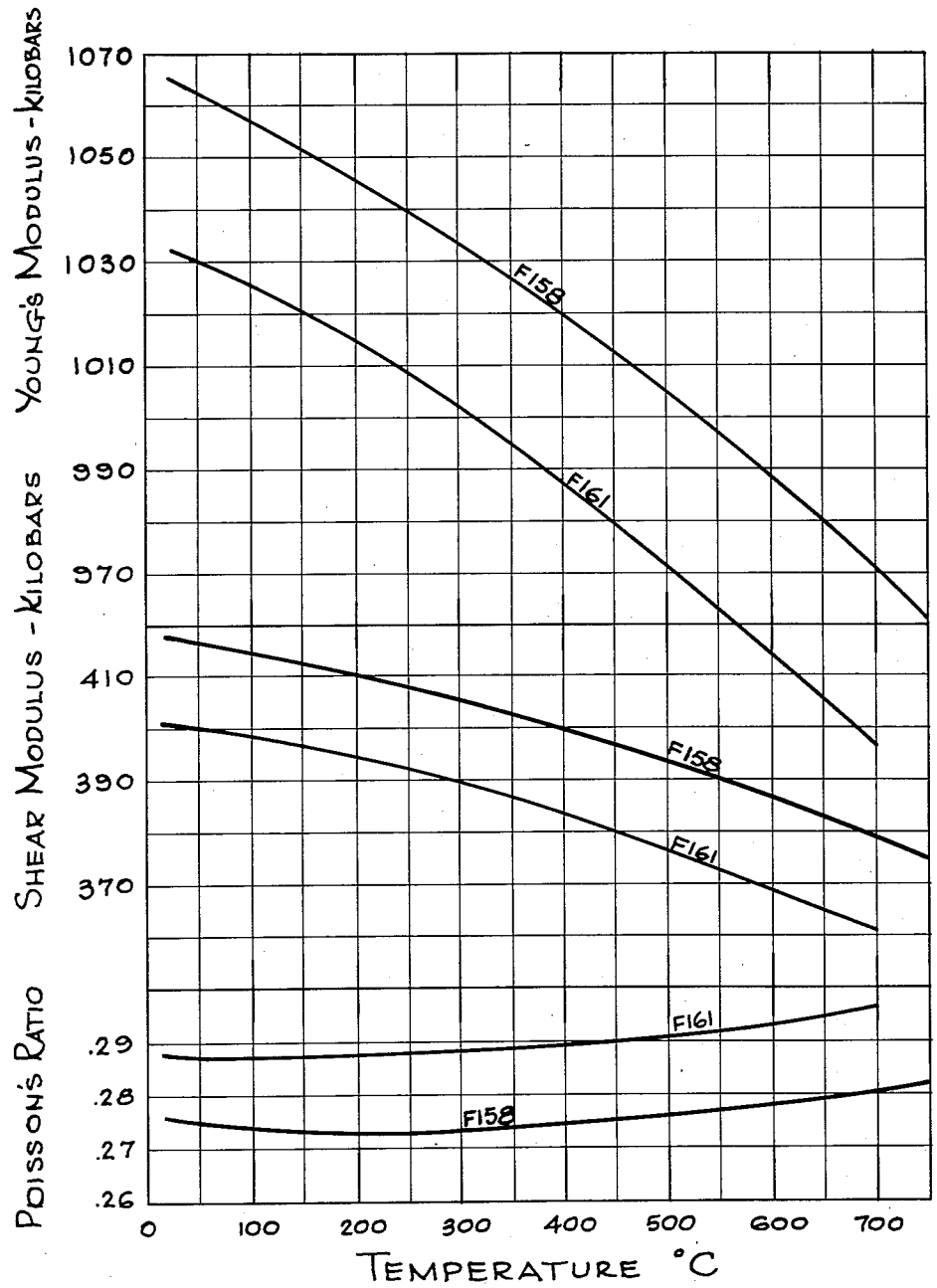
FIG. 15 is a plot of elastic moduli for two multicomponent glasses of the invention which have been developed from the ternary base glasses.

The values for F158 and F161 for elevated temperatures are plotted in FIG. 15. The shape of the curves are similar to those for most types of glasses; i.e., the temperature coefficients of elastic moduli is negative. In comparison, fused silica and Corning 7740, a Pyrex type glass, have positive temperature coefficients of elastic moduli up to the annealing range. The values obtained on glasses F158 and F161 are higher than those of most glasses with only the calcium aluminate glasses having comparable values.

This invention provides glasses containing BaO, TiO₂, and SiO₂ as the principal constituents, and series of glasses based on this ternary system. By way of example, this specification has described series based on glasses having a mole percent composition of SiO₂—50, BaO—30, TiO₂—20; and SiO₂—40, BaO—30, and TiO₂—30.

Variations of two of the members of the series, Ta₂O₅ and ThO₂, based on the latter mole percent composition expressed in the preceding paragraph are also presented as examples of the many glasses which may be formed in the light of the teachings of the invention. These glasses also have desirable characteristics such as high refractive indices, good transmittances in the near infrared at wave lengths below five microns, high deformation temperatures, good chemical durabilities, and the capability of being formed in large amount melts.

The glasses of the instant invention are useful where infrared transmitting glasses are required as in fire control and other optical devices, for making achromatically corrected lens systems which need glasses having high refractive indices and dispersions over a considerable range, and where good chemical durability is necessary for withstanding chemical attack as in antireflection coatings applied to lens elements.

Obviously many modifications and variations of the present invention are possible in the light of the above teachings. It is therefore to be understood that within the scope of the appended claims the invention may be practiced otherwise than as specifically described.

What is claimed is:

1. A non-crystalline infrared transmitting glass having a melting point of less than 2750° F., a high refractive index, high deformation temperatures, good resistance to chemical attack over the entire pH range, and good transmittances at wavelengths below five microns consisting of:

19 mole percent of BaO
20 mole percent of $TiO_2$
44 mole percent of $SiO_2$
7 mole percent of $La_2O_3$
5 mole percent of $ZrO_2$
4 mole percent of $ThO_2$
1 mole percent of $Ta_2O_5$ 2. A non-crystalline infrared transmitting glass having a melting point of less than 2750° F., a high refractive index, high deformation temperature, good resistance to chemical attack over the entire pH range, and good transmittances at wavelengths below five microns consisting of:

17 mole percent of BaO
30 mole percent of $TiO_2$
37 mole percent of $SiO_2$
7 mole percent of $La_2O_3$
3 mole percent of $ZrO_2$
6 mole percent of $ThO_2$

References Cited in the file of this patent

UNITED STATES PATENTS

| | | |
|---|---|---|
| 2,702,749 | Hafner et al. | Feb. 22, 1955 |
| 2,790,723 | Stradley et al. | Apr. 30, 1957 |

FOREIGN PATENTS

| | | |
|---|---|---|
| 496,508 | Great Britain | Dec. 1, 1938 |